United States Patent
Ginetti

(10) Patent No.: US 10,878,164 B1
(45) Date of Patent: Dec. 29, 2020

(54) METHODS, SYSTEMS, AND COMPUTER PROGRAM PRODUCT FOR INTERACTIVELY PROBING A MULTI-FABRIC ELECTRONIC DESIGN

(71) Applicant: Cadence Design Systems, Inc., San Jose, CA (US)

(72) Inventor: Arnold Jean Marie Gustave Ginetti, Antibes (FR)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/157,005

(22) Filed: Oct. 10, 2018

(51) Int. Cl.
   *G06F 17/50* (2006.01)
   *G06F 30/398* (2020.01)
   *G06F 30/367* (2020.01)
   *G06F 111/20* (2020.01)
   *G06F 117/08* (2020.01)

(52) U.S. Cl.
   CPC .......... *G06F 30/398* (2020.01); *G06F 30/367* (2020.01); *G06F 2111/20* (2020.01); *G06F 2117/08* (2020.01)

(58) Field of Classification Search
   CPC ............ G06F 17/5081; G06F 17/5036; G06F 2217/02; G06F 2217/86; G06F 30/398; G06F 30/367; G06F 2111/20; G06F 2117/08
   USPC .......... 716/100–104, 110–111, 118–119, 139
   See application file for complete search history.

(56) References Cited

U.S. PATENT DOCUMENTS

| | | |
|---|---|---|
| 4,457,027 A | 7/1984 | Gladstone |
| 6,397,370 B1 | 5/2002 | Fernandez |
| 6,748,572 B2 | 6/2004 | Fujine |
| 7,257,799 B2 | 8/2007 | McKenney |
| 7,318,207 B2 | 1/2008 | Takabe |
| 7,468,982 B2 | 12/2008 | Mehra |
| 7,555,739 B1 | 6/2009 | Ginetti |
| 7,779,286 B1 | 8/2010 | Pritchard |
| 7,802,221 B1 | 9/2010 | Brink |
| 8,136,071 B2 | 3/2012 | Solomon |
| 8,191,035 B1 | 5/2012 | Van Brink |

(Continued)

OTHER PUBLICATIONS

Non-Final Office Action dated Nov. 14, 2019 for U.S. Appl. No. 16/157,001.

(Continued)

*Primary Examiner* — Nghia M Doan
(74) *Attorney, Agent, or Firm* — Vista IP Law Group, LLP

(57) ABSTRACT

Disclosed are methods, systems, and articles of manufacture for probing a multi-fabric electronic design that spans across multiple design fabrics. These techniques identify a single layout editor, a first electronic design in a first design fabric, and a second electronic design in a second design fabric. An input for probing a circuit component in the first electronic design may further be identified at a user interface of a computing system. The circuit component being probed is connected to an instance of the second electronic design. In response to the input, one or more co-design modules render a representation of the first layout with emphasized circuit components in the first design fabric and the second design fabric, wherein the one or more co-design modules are stored at least partially in memory of and function in conjunction with at least one microprocessor of a computing system.

20 Claims, 10 Drawing Sheets

(56) References Cited

U.S. PATENT DOCUMENTS

| | | |
|---|---|---|
| 8,286,025 B1 | 10/2012 | Pritchard |
| 8,930,878 B1 | 1/2015 | Leef |
| 9,092,586 B1 | 7/2015 | Ginetti |
| 9,129,081 B2 | 9/2015 | Ginetti |
| 9,141,746 B1 | 9/2015 | Ginetti |
| 9,208,273 B1 | 12/2015 | Morlat |
| 9,223,915 B1* | 12/2015 | Ginetti ............... G06F 17/5022 |
| 9,286,421 B1 | 3/2016 | Kukal |
| 9,542,084 B1 | 1/2017 | Colancon |
| 9,684,748 B1 | 6/2017 | Badel |
| 9,761,204 B1 | 9/2017 | Ginetti |
| 9,773,082 B1 | 9/2017 | Morlat |
| 9,830,417 B1 | 11/2017 | Ginetti |
| 9,842,183 B1 | 12/2017 | Ginetti |
| 10,331,841 B1 | 6/2019 | Ginetti |
| 10,467,370 B1* | 11/2019 | Kukal ................ H05K 3/0005 |
| 10,496,772 B1 | 12/2019 | Ginetti |
| 10,558,780 B1* | 2/2020 | Kukal ................ G06F 30/398 |
| 2004/0156322 A1 | 8/2004 | Mehra |
| 2008/0313581 A1 | 12/2008 | Gernhoefer |
| 2010/0205575 A1* | 8/2010 | Arora ................ G06F 3/04812 |
| | | 716/122 |
| 2013/0097572 A1 | 4/2013 | Ginetti |
| 2015/0089458 A1 | 3/2015 | Chang |
| 2016/0070841 A1 | 3/2016 | Salowe |
| 2016/0147908 A1 | 5/2016 | Ni |

OTHER PUBLICATIONS

Final Office Action dated Apr. 14, 2020 for U.S. Appl. No. 16/157,001.
Non-Final Office Action dated Nov. 8, 2019 for U.S. Appl. No. 16/157,011.
Notice of Allowance dated Feb. 9, 2016 for U.S. Appl. No. 14/503,403.
Ex Parte Quayle dated Nov. 27, 2015 for U.S. Appl. No. 14/503,403.
Notice of Allowance dated May 7, 2020 for U.S. Appl. No. 16/157,011.

* cited by examiner

METHODS, SYSTEMS, AND COMPUTER PROGRAM PRODUCT FOR INTERACTIVELY PROBING A MULTI-FABRIC ELECTRONIC DESIGN

CROSS REFERENCE TO RELATED APPLICATIONS

This application is also related to U.S. patent application Ser. No. 16/157,001 filed on concurrently and entitled "METHODS, SYSTEMS, AND COMPUTER PROGRAM PRODUCT FOR REDUCING INTERFERENCES AND DISTUBRANCES IN A MULTI-FABRIC ELECTRONIC DESIGN", and U.S. patent application Ser. No. 16/157,011 filed on concurrently and entitled "METHODS, SYSTEMS, AND COMPUTER PROGRAM PRODUCT FOR DETERMINING LAYOUT EQUIVALENCE FOR A MULTI-FABRIC ELECTRONIC DESIGN". This application is also related to U.S. patent application Ser. No. 14/503,404 filed on Oct. 1, 2014 and entitled "METHOD, SYSTEM, AND COMPUTER PROGRAM PRODUCT FOR IMPLEMENTING A MULTI-FABRIC ELECTRONIC DESIGN SPANNING ACROSS MULTIPLE DESIGN FABRICS". The contents of the aforementioned U.S. patent applications are hereby incorporated by reference in their respective entireties for all purposes.

BACKGROUND

In conventional electronic designs, the integrated circuits, the IC (integrated circuit) packaging, and the printed circuit boards are often developed and designed independently. Modern electronic designs often require or desire developing the integrated circuit, the their respective packaging, and the printed circuit board incorporating multiple packaged integrated circuits in a multi-fabric environment. That is, one designer may need or desire to design in the context of the others. For example, the integrated circuit designer may need or desire to implement the integrated circuit design in view of the contexts of the packaging fabric as well as the printed circuit board fabric.

Similarly, a printed circuit board designer may need or desire to implement or tune the printed circuit design in the context of the packaging design fabric and/or the integrated circuit design fabric. As a practical example where an advanced package is to be incorporated onto a PCB for a consumer product that is driven by cost considerations and performance. In conventional approaches, while device placement and assignment decisions made solely in the context of the chip may yield the ideal chip-level design, these device placement and assignment decisions could nevertheless result in missing the cost or performance goals for the end consumer product. In these convention approaches, the chip-level placement usually dictates, for example, the bump and ball assignments in the downstream fabrics that may result in excessive coupling in, for example, the interfaces and a complex routing scheme that requires additional layers in the package and/or PCB substrates.

An electronic device (e.g., a computing system, a mobile communication device, etc.) is an integrated system that includes, for example, one or more PCBs each having one or more IC packages and a plurality of discrete components, cells, etc. An electronic design for such a device thus includes multiple fabrics such as the PCB design fabric, the IC package design fabric, the IC design fabric, etc. Each design fabric corresponds to its own techfile and databases that are not natively editable by the design tools for other design fabrics. In fact, some of these databases are even incompatible with each other. Conventional approaches thus isolate these design fabrics by using dedicated electronic design automation tools for different design fabrics. When a project starts, conventional approaches distribute the design tasks for each design fabric among team members who then use the dedicated tools to initiate and complete the design.

The challenges arise during subsequent debugging, optimization, and design closure where the developer must verify whether the electronic design performs its functions as designed to meet the specification. Conventional approaches tackle the subsequent debugging, optimization, and design closure by going back and forth between different design tools to perform various editing, fixes, analyses, etc. until design closure is properly achieved for the electronic design.

For example, in a co-design task such as an IC package and IC co-design, a PCB-IC package-IC co-design, etc., conventional approaches may need to separately open an IC package layout tool and an IC layout tool, extract the geometries and sends the extracted geometries to an analysis or verification engine. The analysis or verification engine then receives a set of stimuli to analyze the electronic design in order to determine predicted behaviors of the electronic design in response to the set of stimuli. If the results indicate an error in the electronic design, the designer opens the corresponding layout editor to fix the error. If the error in one design fabric also negatively affects the behavior in another design fabric, the designer needs to open the corresponding layout editor to make corresponding modifications before the electronic design or at least the affected portion thereof may be extracted and re-analyzed. The aforementioned process repeats iteratively until the entire electronic design meets the design specification.

Such a workflow process wastes unnecessary computational resources and more importantly, fail to capture some errors in earlier stages and thus allow such errors to propagate into later stages of the entire design process. For example, a designer may perform various placement and route tasks for an RF package design that includes multiple ICs, discrete components and cells, and interconnects. The designer may desire to know whether a net in the RF package design forms a loop that fully encloses, for example, one or more inductors so that the behaviors of such one or more inductors are negatively impacted by the loop. Often, a loop is formed in such an RF package even though the interconnects in the RF package design fabric do not appear to form any loops at all, yet the internal connections within, for example, one or more ICs, complete the loop with the interconnects in the RF package design fabric. Such a loop cannot be easily identified and thus may easily propagate well into some later stages of the design process when such an error has become very expensive (in terms of computational resource consumption and also in terms of time-to-market) to fix.

Conventional approaches' moving back and forth between designated EDA tools for respective design fabrics certainly do not alleviate such problems, even with cross-reference or mapping between these multiple deign fabrics. Furthermore, a designer may often desire or require to perform some much simpler tasks such as probing a net or a circuit component to identify certain electrical and/or parasitic characteristics of the probed circuit component or net during the design creation stage. In this scenario, the designer also needs to separately invoke designated EDA tools, switch among such tools while losing the contextual information of the electronic design details in other design fabrics, and then perform these much simpler tasks. This is at least in part due to the isolation between the techfile and database(s) for one design fabric and the corresponding techfile(s) and database(s) for other design fabrics. Therefore, there is a need to provide an interactive co-design environment to resolve at least the aforementioned challenges, shortcomings, and problems.

Thus, there is a need for methods, systems, and computer program products for determining layout equivalence between a plurality of versions of a single layout for a multi-fabric electronic design to address at least the aforementioned issues and shortcomings. It shall be noted that some of the approaches described in this Background section constitute approaches that may be pursued, but not necessarily approaches that have been previously conceived or pursued. Therefore, unless otherwise explicitly stated, it shall not be assumed that any of such approaches described in this section quality as prior art merely by virtue of their inclusion in this section.

SUMMARY

Disclosed are method(s), system(s), and article(s) of manufacture for probing a multi-fabric electronic design in one or more embodiments. Some embodiments are directed at a method for probing a multi-fabric electronic design.

Some embodiments identify a single layout editor, a first electronic design in a first design fabric, and a second electronic design in a second design fabric. An input for probing a circuit component in the first electronic design may further be identified at a user interface of a computing system. The circuit component being probed is connected to an instance of the second electronic design. In response to the input, one or more co-design modules render a representation of the first layout with emphasized circuit components in the first design fabric and the second design fabric, wherein the one or more co-design modules are stored at least partially in memory of and function in conjunction with at least one microprocessor of a computing system.

In some embodiments, the first design fabric as an active design fabric may be identified; and the input may be received at the user interface via an input device that identifies a cursor location on a display of the computing system. In some of these embodiments, the circuit component for probing may be identified at least by mapping the cursor location to a design location and by determining the circuit component in the active design fabric with the design location; and second design fabric connectivity pertaining to the circuit component in the active design fabric may also be identified based at least in part upon first design fabric connectivity. Moreover, the instance may be identified based at least in part the first design fabric connectivity or the second design fabric connectivity.

In addition or in the alternative, at least one net corresponding to the input may be identified based at least in part upon first design fabric connectivity; and one or more circuit components that include the instance may also be identified along the at least one net in the first design fabric. In some embodiments, a first representation of the one or more circuit components may be modified or re-generated with emphasis; and a layout of the second electronic design in the second design fabric may be identified with at least the first design fabric connectivity pertaining to the instance.

In some embodiments, a customizable detailed view may be rendered with design data from the layout of the second electronic design in the second design fabric; and an abstracted representation of the instance in the first electronic design may be replaced or overlaid with the customizable detailed view of the instance. In some of these embodiments, an internet net may be identified from the layout of the instance in the second design fabric with at least the first design fabric connectivity and the second design fabric connectivity; and one or more internal circuit components may also be identified in the layout of the instance along the internet.

In some of the immediately preceding embodiments, the customizable detailed view may be transformed into a transformed customizable detailed view at least by rendering a second representation of the one or more internal circuit components with emphasis; and the customizable detailed view may be replaced or overlaid with the transformed customizable detailed view in the user interface corresponding to an active design fabric. Moreover, a design browser may be updated with information about the at least one net, the one or more circuit components, the internal net, and the one or more internal circuit components in the user interface.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
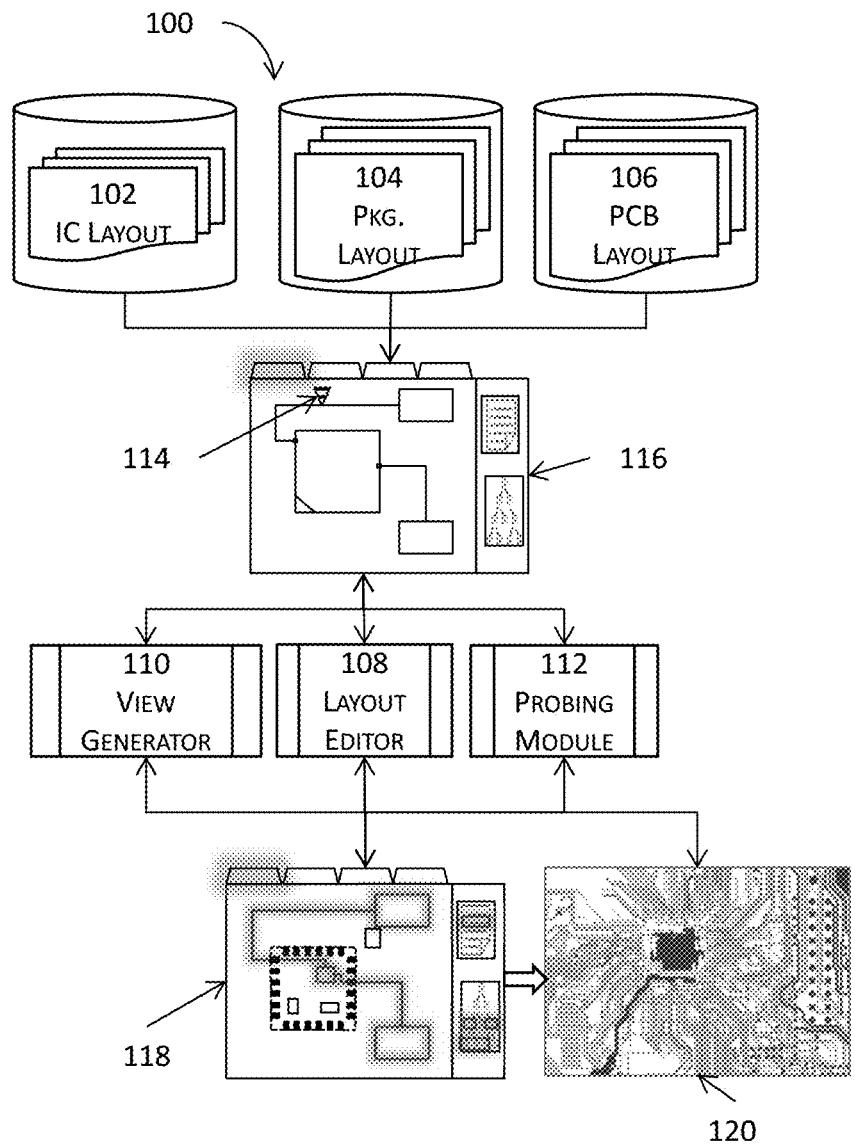
FIG. 1 illustrates a high level block diagram of a simplified system for probing a multi-fabric electronic design in one or more embodiments.

Various techniques are directed to probing a multi-fabric electronic design in various embodiments. The present invention augments a conventional layout editor by creating multiple tabs each corresponding to a design fabric in a single, unified layout window of a single layout tool. For example, a layout window may include a PCB tab, one or more package tabs (e.g., silicon package 1, silicon package 2, GAs (gallium arsenide) package 1, GAs package 2, etc.), and one or more IC tabs (e.g., silicon IC 1, silicon IC 2, GAs IC 1, GAs IC 2, etc.)

A designer may activate any of the multiple tabs, and the present invention automatically opens the layout database and techfile corresponding to the design fabric of the selected tab. The selected tab may include an abstracted instance of a block of circuit components that belongs to another design abstract. In addition, the present invention opens one or more databases and the techfile that belong to at least one other design fabric in which the abstracted view is created natively, create a view including the view of the design details of the abstracted instance in the at least one other design fabric, and overlays the view with the abstracted instance in the selected tab. In this manner, a designer working on the selected tab also visibly sees the details of the abstracted view and is thus enabled to modify the circuit components belonging to the selected design fabric with the appropriate contextual information of the electronic design in other non-selected or non-activated design fabrics.

The view generated by the present invention may be read-only and not subject to any modifications to the design data of the underlying electronic design in some embodiments so as to avoid accidentally modifying the portions of the electronic design that do not belong to the activated design fabric. Such an hard isolation between two design fabrics also facilitates the ease of interactive design tasks such as selecting, grouping, moving, displaying, or highlighting a certain group of circuit components (e.g., display metal-5 circuit components where both the PCB layout and the IC layout may have their own metal-5 layers). This not only facilitates the ease of such interactive or even non-interactive design tasks or operations but also reduce the clutter in the design window by suppressing unrelated circuit components from being displayed. In some other embodiments, a soft isolation or even no isolation may be imposed between two design fabrics so that a designer may freely select, modify, etc. any part of the electronic design by, for example, clicking on a circuit component with a point device, regardless of which design fabric the circuit component belongs to.

In some embodiments, a view generated by the presented invention for circuit components belonging to non-activated or non-selected design fabrics may be customized by the user. For example, a designer may enter a desired level of granularity for display by enter a display stop value (e.g., stop displaying circuit components below the second hierarchy from the top hierarchy). This desired level of granularity for display may be dynamically changed by the user at any time, and the present invention will refresh the displayed view accordingly. In addition or in the alternative, a view so generated may be static or dynamic. For example, when a designer zooms in to a portion in the package layout including an abstracted IC instance, the displayed results include the zoomed-in view of the circuit components in the IC package design fabric with full editability as well as the zoomed-in view of the corresponding view (or a portion thereof, depending how the layout window is manipulated by the zoom command) for the IC layout.

A working example of the present invention includes the scenario where a designer probes, for example, a net in a package layout (after activating the package layout by selecting the package layout tab). In this example, the net belongs to the package layout and connects to pin of an IC that belongs to the IC design fabric. Without the present invention, the IC is displayed in the package layout as an abstracted instance having, for example, only the interface elements (e.g., pins) that interconnect to other circuit components in the package layout. The present invention generates a view for the abstracted IC instance to include a desired level of design details and aligns (e.g., by overlaying or by replacement) the view with the abstracted IC instance so that the designer can see the desired level of details in the IC while working on the IC package layout.

When the designer probes a net in the IC package layout, the present invention identifies the net segments and circuit components connected to the identified net (e.g., the net segments and circuit components that are connected to the net segment on which the designer clicks) until reaching the boundary (e.g., pin) of the IC. The present invention then identifies the pin of the IC in the package layout, opens the IC layout (which may or may not be displayed to the user), finds the corresponding pin in the IC layout, and continue tracing the interconnections within the IC layout until either a termination or a desired level of tracing (e.g., trace interconnection by three or fewer hierarchies) is reached.

The interconnects and circuit components identified by the present invention may be emphasized graphically and/or textually (e.g., highlighted). Identifying and highlighting circuit components not belonging to the design fabric of the active tab can be simply achieved by opening the design database and selects these circuit components and graphically and/or textually (e.g., by using balloons including textual information pertaining to probing) modify the display characteristics (e.g., line color, line width, balloons with pertinent textual information, etc.) of such circuit components because these circuit components are also editable in these embodiments. In some embodiments where the view of the IC is isolated from that of the IC package layout so that the displayed design details in the IC are for viewing purposes but are not editable, the present invention may artificially re-create an emphasized view by artificially creating graphical and/or textual emphasis and overlay or replace the existing view with the emphasized view. In this manner, a designer can easily see the results in the single, unified layout window without going back and forth between different EDA tools.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention.

Further, various embodiments encompass present and future known equivalents to the components referred to herein by way of illustration. Moreover, it shall also be noted that the figures are intended only to facilitate the description of the disclosed embodiments and/or examples but are not representative of an exhaustive treatment of all possible embodiments and/or examples and are not intended to impute any limitations as to the scope of the claims, embodiments, and/or examples. In addition, any figures or their corresponding description need not necessarily portray all aspects or advantages in any particular environment. Any aspect or advantage described in conjunction with a particular embodiment and/or example is not necessarily limited to that embodiment and/or example and can be practiced in any other embodiments and/or examples even if not so illustrated. References throughout this specification to "some embodiments" or "other embodiments" refer to a particular feature, structure, material or characteristic described in connection with the embodiments as being included in at least one embodiment. Thus, the recitation of the phrases "in some embodiments" or "in other embodiments" in various places throughout this specification is not necessarily referring to the same embodiment or embodiments. The disclosed embodiments are not intended to be limiting of the claims.

In addition, unless otherwise explicitly stated, the recitation of the phrases "in some embodiments" or "in other embodiments" in this specification does not necessarily mean any of the features, advantages, aspects, etc. described "in some embodiments" do not or cannot be combined with any of the other features, advantages, aspects, etc. described "in other embodiments". Thus, any features, advantages, aspects, etc. described in this specification can be combined and can function in conjunction with each other, unless otherwise explicitly stated or recited.

FIG. 1 illustrates a high level block diagram of a simplified system for probing a multi-fabric electronic design in one or more embodiments. More specifically, a multi-fabric layout 116 may be identified from, for example, the memory or one or more storage devices 100. For example, a layout session of an EDA layout tool may open an IC package layout 104 or a PCB (printed circuit board) layout 106 as the multi-fabric layout 116.

The multi-fabric electronic design spans across multiple design hierarchies. For example, a PCB layout includes circuit components in the PCB design fabric, the IC package design fabric, and the IC design fabric. Hierarchically, the PCB design fabric includes the IC package design fabric which, in turn, includes the IC design fabric. For example, a PCB layout may include a plurality of IC packages, and each IC package includes one or more ICs. As a result, the IC package layout 104 or the PCB layout 106 may each include one or more IC layouts 102. It shall be noted that these design fabrics are provided herein for the ease of illustration and description, and that other design fabrics are also contemplated.

One or more computing systems (not shown) may invoke and execute a plurality of modules, which are specifically programmed and stored at least partially in memory of and functions in conjunction with at least one microprocessor or processor core of the one or more computing systems, to perform various functions to probe a multi-fabric electronic design. For example, a IC package or PCB designer may probe a circuit component (e.g., a net segment, a pin, etc.) 114 in the multi-fabric electronic design. Regardless of which design fabric the probed circuit component is located, various techniques described herein perform a particular sequence of processes and computer operations to ascend and/or descend into one or more different design fabrics to identify the nets electrically connected to the circuit component being probed as well as other circuit component(s) electrically connected to these nets.

The layout 116 may be re-rendered to display these identified nets and circuit components with graphical and/or textual emphasis. For nets and circuit components that belong to a different design fabric from the activated design fabric, an artificial view of these nets and circuit components may be generated and overlaid in the layout window in the activated design fabric. In these embodiments, when a user probes a circuit component 114 with a probing module 112 in the multi-fabric electronic design 116, the layout editor 108 may function in tandem with one or more other modules to identify connected nets and circuit components across multiple design fabrics; and the view generator 110 may function with the layout editor 108 to transform the representation of the multi-fabric electronic design 116 into the transformed representation 118 of the multi-fabric electronic design. The present invention may then cause the occurrence of manufacturing or fabrication of the underlying electronic circuit 120 at least by forwarding a final version (e.g., a signed-off version) of the electronic design to fabrication equipment (e.g., photomask manufacturing equipment, lithographic equipment, etc.)

The present invention provides an interactive co-design environment and an augmented user interface that enhances users' experiences in performing co-design tasks of an electronic design that span across multiple design fabrics, with the proper contextual information of other design details in different design fabrics.

Figure 2:
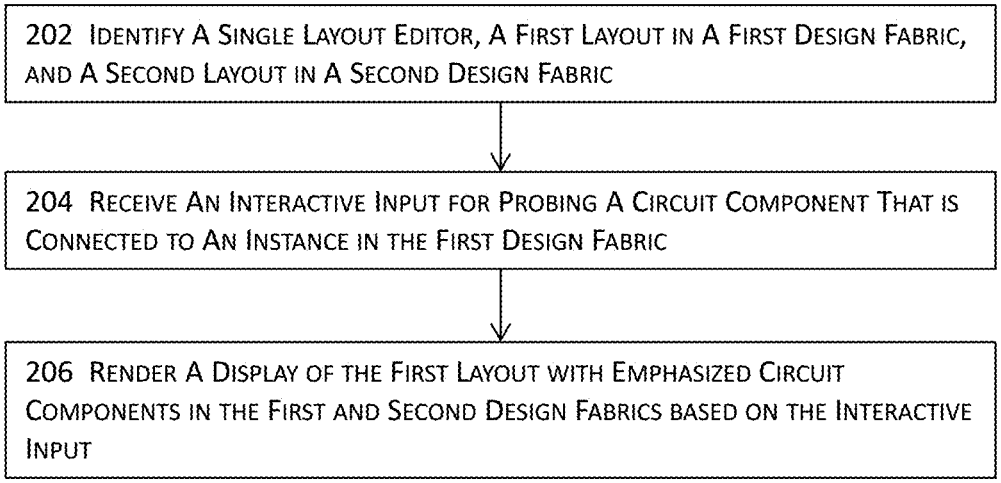
FIG. 2 illustrates a high level block diagram for probing a multi-fabric electronic design in one or more embodiments.

FIG. 2 illustrates a high level block diagram for probing a multi-fabric electronic design in one or more embodiments. In these embodiments, a single layout editor may be identified at 202. This single layout editor may be used to access layouts in more than one design fabric. In addition, these embodiments may further identify a first layout in a first design fabric and a second layout in a second design fabric at 202. For example, these embodiments may identify an IC package layout as the first layout and an IC layout as the aforementioned second layout at 202. In this example, the IC layout is represented as an abstracted instance having, for example, only the interface elements (e.g., pins) but no other design details in the IC package layout.

Although the single layout editor may natively access layouts in multiple design fabrics, some embodiments may isolate these design fabrics from each other so users do not accidentally modify a circuit component in a design fabric that the users do not intend to modify. In addition, a user may desire to implement a portion of the layout in a specific design fabric, without having to worry about inadvertently select, view, modify, or other manipulate circuit components in other design fabrics. In these embodiments, the single layout editor may include multiple tabs, each corresponding to a design fabric, although the display windows in these multiple tabs may show exactly the same contents. Users may thus activate the editing capability for a specific design fabric by, for example, select the corresponding tab in these embodiments. It shall be noted that other mechanisms may be in place to isolate design fabrics from each other and to enable the editing capabilities. For example, specific commands or icons may be provided in the user interface for the user to selectively activate one or more design fabrics so that users may edit the design details in these one or more design fabrics while the design details in the other, non-activated design fabrics are not editable.

An input for probing a circuit component may be received at the user interface at 204. Moreover, the circuit component is electrically connected to an abstracted instance in the first design fabric and thus includes only the interface elements (e.g., pins) but no other design details. More details about 204 will be described below with reference to FIG. 3A.

In response to the input, a display of the first layout in the first design fabric may be rendered or re-rendered at 206 with graphically and/or textually emphasized circuit components in both the first and second layouts, despite the fact that the first layout and the second layout belong to different design fabrics.

These circuit components displayed at 206 include the circuit component being probed, one or more first design fabric circuit components connected to the probed circuit component, and one or more second design fabric circuit components that are also electrically connected to the aforementioned first design fabric circuit components. In the aforementioned example of probing a net (in the IC package design fabric) that is further connected to an IC instance (in the IC design fabric), the emphasized circuit components include the net being probed and one or more first circuit components in the IC package design fabric. These emphasized circuit components further include circuit components that belong to the IC design fabric and are electrically connected to the net or the one or more first circuit components.

In some embodiments where multiple design fabrics are isolated from each other to prevent cross editing, the circuit components that belong to the non-activated design fabric may be rendered as a static or dynamic view with not editability, and this artificially rendered view may be used to replace or overlay the abstracted although this static or dynamic view may also be manipulated together with the remainder of the first layout in the first, activated design fabric.

In the above example with an IC package layout as the first layout and the IC layout as the second layout, a designer may activate the IC package design fabric so that the designer may modify the IC package layout. The IC is represented as an abstracted instance having only the interface elements but no other design details. When the user probes a net segment, the present invention determines all the circuit components that are electrically connected to the probed net segment from both the IC package design fabric and the IC design fabric. Moreover, the original, abstracted IC instance in the IC package layout is replaced with or overlaid by a non-editable view showing the connected circuit components within the IC. More details about 206 will be described below with reference to FIG. 3B-3C.

Figure 3A:
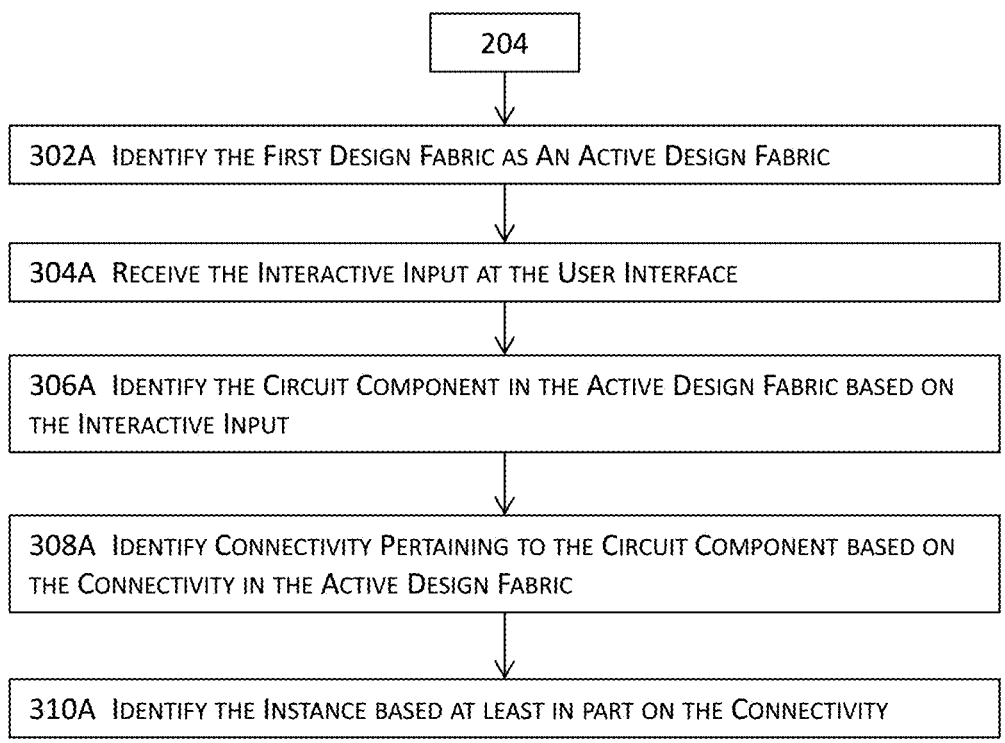
FIGS. 3A-3C illustrate more details about a portion of the high level block diagram illustrated in FIG. 2 in one or more embodiments.
Figure 3B:
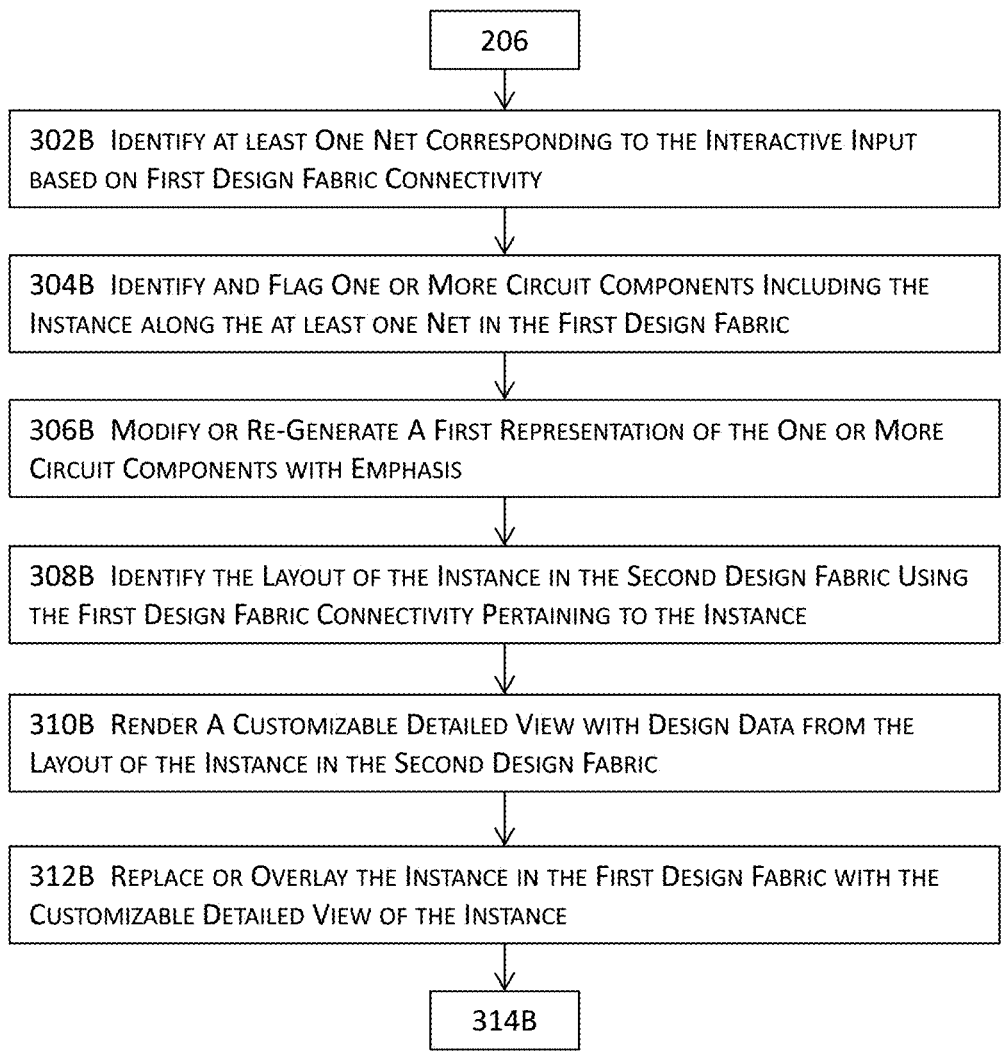
Figure 3C:
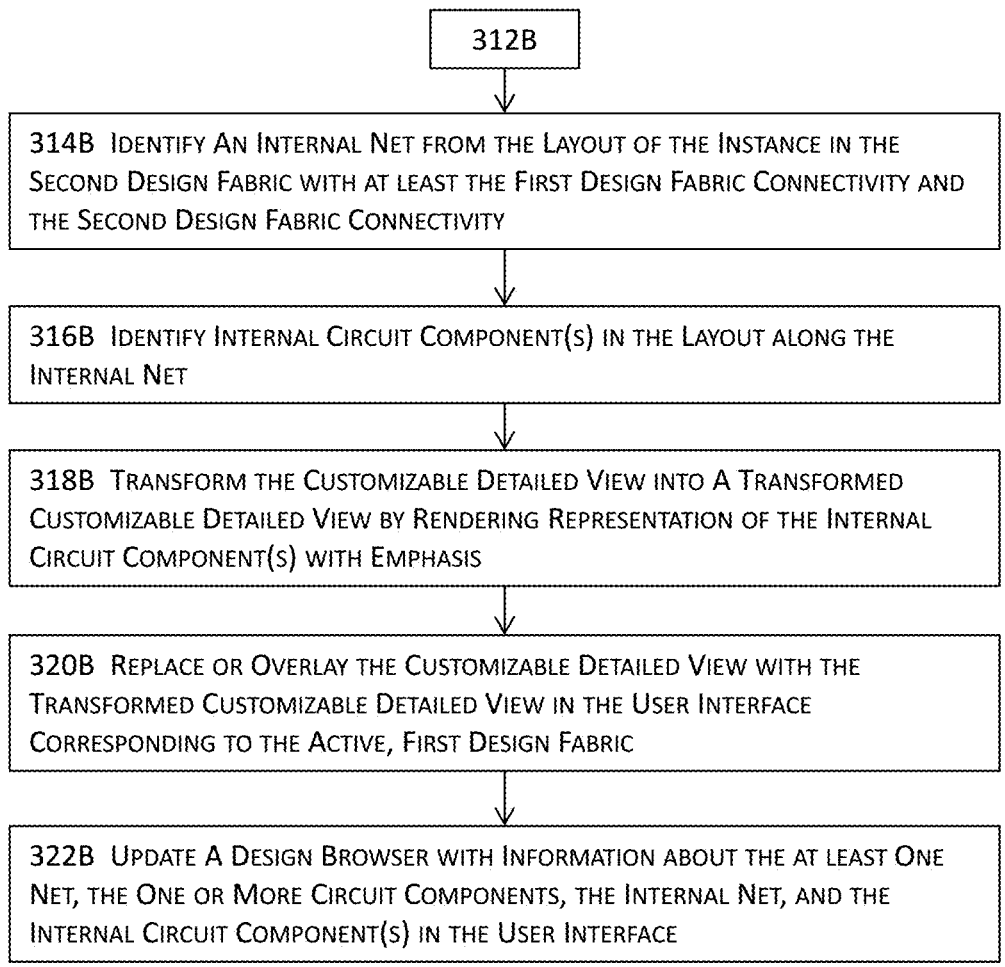

FIGS. 3A-3C illustrate more details about a portion of the high level block diagram illustrated in FIG. 2 in one or more embodiments. More specifically, FIG. 3A illustrates more details about receiving an input at a user interface for probing a circuit component in the first design fabric (204) of FIG. 2A. In these embodiments, the first design fabric may be identified at 302A as an activated or active design fabric. For example, a user may activate the IC package design fabric at 302A by, for example, clicking on the tab corresponding to the IC package design fabric (in a tabbed layout editor) or by clicking on a command that activates the editability capability for the IC package design fabric. An input may also include, for example, a user's clicking on a circuit component (e.g., a pin) in a design browser that includes the circuit design components in the first layout in some other embodiments.

The input may be received at 304A via an input device at the user interface. For example, a user may click on the probe command from the menu of the user interface and further click on a net segment that belongs to an IC package layout and is electrically connected to an IC instance to indicate that the user intends to probe the net segment to obtain related data (e.g., electric current, parasitics, properties, etc.) The circuit component may then be identified at 306A based at least in part upon the input received at 304A. For example, these embodiments may compare the screen location at which user's click is received to the location in the first layout to identify which circuit component is clicked on (hence which circuit component the user intended to probe).

To identify which other circuit components are electrically connected to the probed circuit component, connectivity pertaining to the probed circuit component may be identified at 308A. The identified connectivity includes the connectivity in the activated design fabric (e.g., IC package connectivity) as well as the connectivity in one or more other design fabrics (e.g., IC connectivity) that pertain to the probed circuit component. In some embodiments, connectivity may be identified at 308A by using a divide and conquer methodology. That is, these embodiments may trace the connectivity from the probed circuit component until reaching circuit components in different design fabrics. Then these embodiments identify connectivity for these different design fabrics to continue tracing the connectivity.

An instance that belongs to a non-activated design fabric and is electrically connected to the probed circuit component (directly without any intervening circuit components or indirectly with one or more intervening circuit components) may be identified at 310A based at least in part upon the connectivity identified at 308A. It shall be noted that the identification of an instance in a non-activated design fabric is to demonstrate that the present invention is not limited by the boundaries of design fabrics although the present invention also operates with full and equal effects in a single design fabric.

FIGS. 3B-3C jointly illustrate more details about rendering or re-rendering a display with graphically and/or textually emphasized circuit components at 206 of FIG. 2. In these embodiments, at least one net that corresponds to the input for probing may be identified at 302B. For example, if a user clicks on a net segment, the net including the net segment may be identified at 302B. As another example where a user probes a pin, the net that is directly connected to the pin is identified at 302B.

One or more circuit components along the at least one net may be identified and flagged for further processing at 304B. These one or more circuit components include an instance that belongs to a non-activated design fabric and may be identified by using the connectivity information (for the activated design fabric). The instance belonging to the non-activated design fabric may also be identified with the binding information that binds and cross references corresponding design data in different abstractions (e.g., the schematic abstraction, the layout abstraction, etc.) across multiple design fabrics (e.g., the PCB design fabric, the IC package design fabric, the IC design fabric, etc.) so that when a circuit component or net segment is identified in one abstraction and one design fabric, the corresponding circuit components in other abstractions and/or design fabrics can be efficiently identified with the binding information.

A first representation of the one or more circuit components may be modified or regenerated at 306B with emphasis. Circuit components that belong to the activated design fabric may be edited and rendered with emphasis. Other circuit components that do not belong to the activated design fabric cannot be edited. For these other circuit components, a static or dynamic view or representation may be generated instead in some embodiments.

The layout of the instance in the second, non-activated design fabric may be identified at 308B with the connectivity information of the first layout in the activated design fabric or with the binding information described above. With the internal circuit component within the instance identified at 308B, a customizable view may be rendered at 310B with design data of the internal circuit component in the layout of the instance in the second non-activated design fabric. The abstracted instance in the first layout in the first, activated design fabric may be optionally replaced with or overlaid by this customizable view of the internal circuit components in the instance at 312B. This customizable view may be populated with additional contents as described below.

An internal net within the instance may be identified from the instance layout in the second design fabric at 314B with at least the connectivity pertaining to the first design fabric and connectivity pertaining to instance layout in the second, non-activated design fabric. For example, some embodiments may trace the connectivity of the first layout from the probed circuit component until reaching, for example, an input pin of the instance in the activated, first design fabric. The binding information pertaining to the input pin in this first, non-activated design fabric may be queried to identify the corresponding internal circuit component within the instance in some embodiments. After identifying the corresponding internal circuit component, the connectivity of the instance layout may be used to further identify the at least one net that is electrically connected to the corresponding internal circuit component in the instance layout.

With the internal net identified at 314B, one or more internal circuit components that are electrically connected to the internal net may be identified at 316B. The aforementioned customizable detailed view may then be transformed into a transformed customizable detailed view by rendering, at 318B, a representation of the internal net and the one or more internal circuit components that are identified at 314B and 316B. The abstracted instance (or the customizable detailed view) in the first layout in the first, activated design fabric may be now replaced with or overlaid by this transformed customizable view of the internal circuit components in the instance at 320B.

At this point, the first layout in the first design fabric no longer merely includes an abstracted instance having only interface elements. Rather, the first layout is not augmented with the transformed customizable detailed view showing the internal circuit components that are located within the instance and are electrically connected (directly or indirectly) to the probed circuit component. The design browser including the information about, for example, the hierarchical structure and circuit components of the first layout may be updated at 322B with information about the circuit components that are electrically connected to the probed circuit component, regardless of the design fabrics in which the circuit components are located.

Figure 4A:
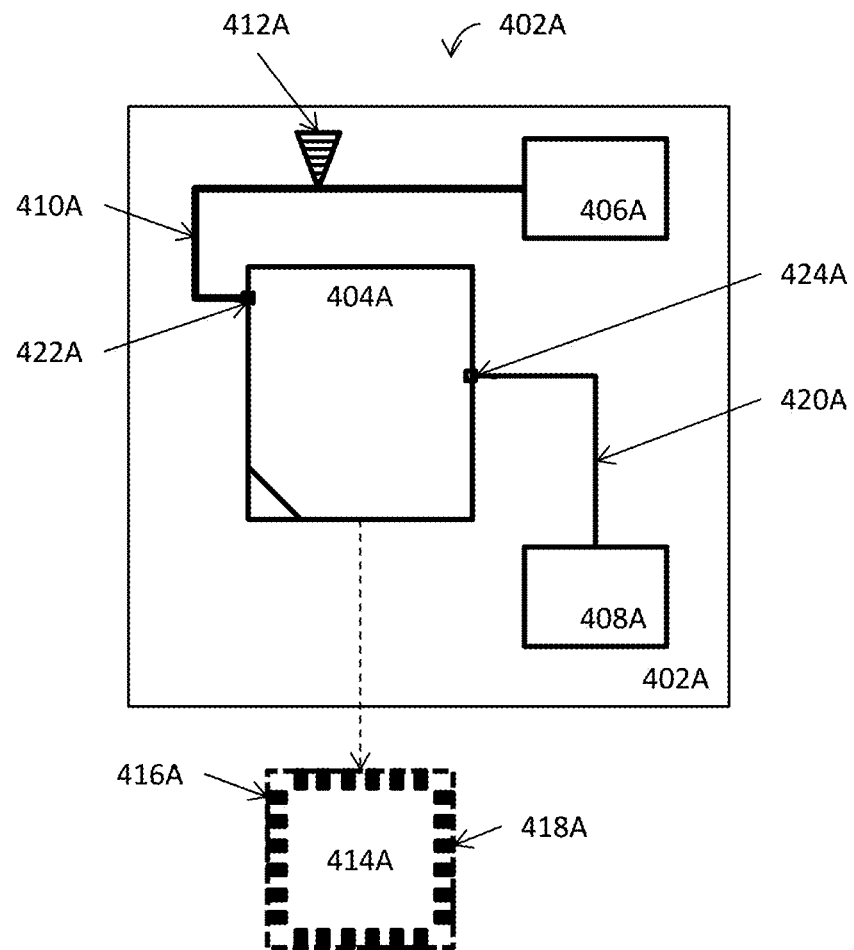
FIGS. 4A-4C illustrate some working examples of the techniques described herein in one or more embodiments.
Figure 4B:
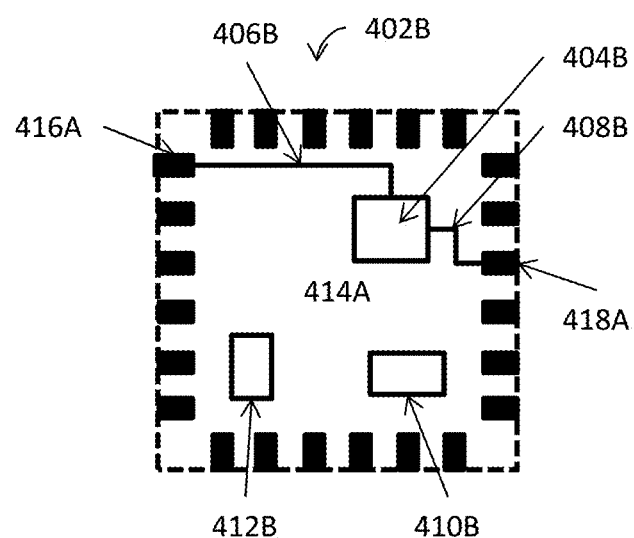
Figure 4C:
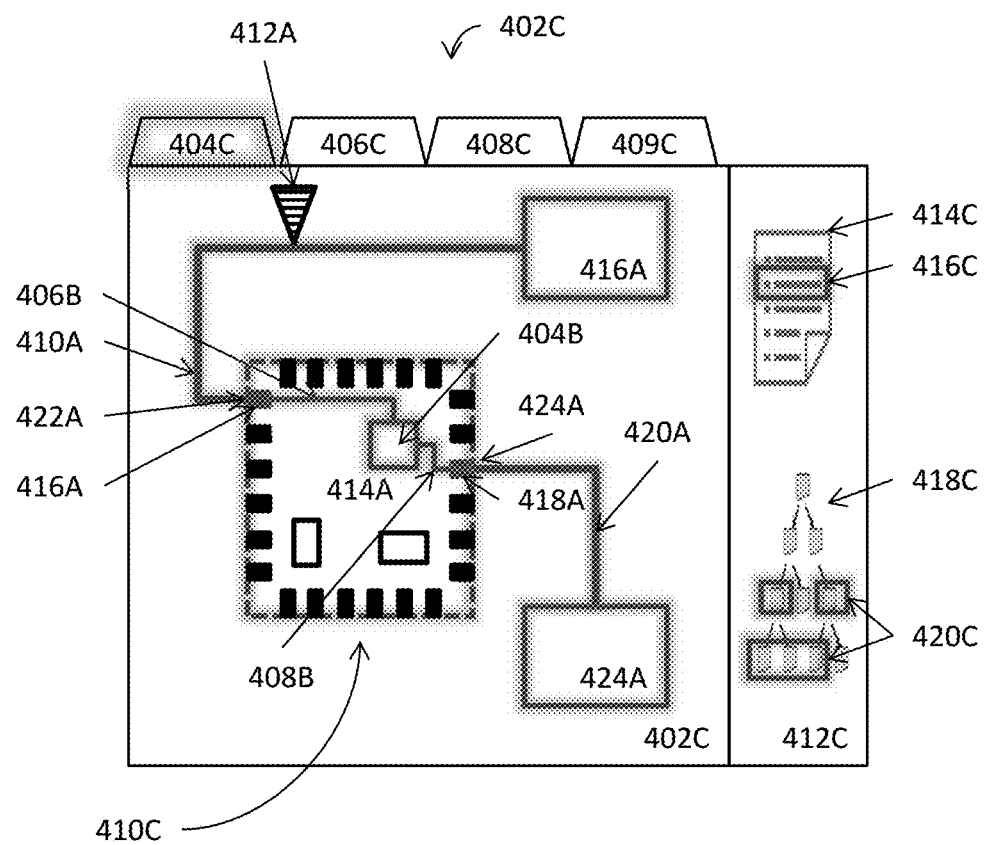

FIGS. 4A-4C illustrate some working examples of the techniques described herein in one or more embodiments. More specifically, FIG. 4A illustrates a multi-fabric electronic design 402A (e.g., an RF IC package layout) that includes three instances (404A, 406A, and 408A) (e.g., three IC instances) that belong to a different design fabric (e.g., an IC design fabric). Moreover, instance 404A is connected with instance 406A via interconnect 410A. Instance 404A is also connected with instance 408A via interconnect 420A.

Different electronic designs belong to different design fabrics are usually manipulated by different electronic design automation tools. For example, an IC package layout is often handled by an IC package layout editor; and an IC layout is handled by an IC layout tool. In the example multi-fabric electronic design 402A, the three instances 404A, 406A, and 408A are represented as abstracted instances that include, for example, interface elements but no other design details. For example, the abstracted instance 404A corresponds a layout 414A that includes only the interface elements (e.g., pins) 416A and 418A but other contains no other design details. Net 422A and net 420A are respectively connected to pin 422A and pin 424A of instance 404A in the multi-fabric electronic design 402A. FIG. 4A further include an inverted triangle symbol 412A that indicates the point at which a user probes the multi-fabric electronic design 402A.

FIG. 4B illustrates a simplified example layout 402B of instance 414A. The layout 402B includes interface pins (416A, 418A, etc.) and three circuit components 404B, 410B, and 412B. Circuit component 404B is connected to pins 416A and 418A via interconnects 406B and 408B, respectively. Other circuit components and interconnections are not shown or described here for the ease of illustration and description.

FIG. 4C illustrates the example of the application of some of the techniques described herein to the example multi-fabric electronic design illustrated in FIGS. 4A-4B and described above. More specifically, FIG. 4C illustrates a portion of a simplified user interface 402C that includes multiple tabs 404C, 406C, 408C, and 409C for a single layout editing tool that handles layouts in multiple design fabrics. These multiple tabs may respectively correspond to, for example, a PCB design fabric, a first GAs (gallium arsenide) package design fabric, a second GAs package design fabric, an IC package design fabric, a first IC design fabric, a second IC design fabric, etc. It shall be noted that four tabs are illustrated in FIG. 4C, and that other user interfaces may include a more or fewer number of tabs.

In some embodiments where different design fabrics are isolated from each other so that only the activated design fabrics are editable whereas the non-activated design fabrics are not, a user may click on one of the tabs in FIG. 4C or select one or more design fabrics to activate via a menu command (not shown). In FIG. 4C, each design fabric may be activated so that a user may use the single layout editing tool to modify the layout contents in the activated design fabric. For example, a user may click on a tab to activate the corresponding design fabric. In some embodiments, the displayed contents in all the tabs are identical, and the difference in the displayed in these tabs is only the content belonging to the activated design fabric is editable. Furthermore, other embodiments may present a single window to display a layout yet provides other mechanisms such as menu commands, menu icons, etc. to perform the same functions such as enabling editability of the content in a specific design fabric while freezing the layout contents in other design fabrics.

When a user probes the multi-fabric electronic design by, for example, clicking on a circuit component (the point of click is illustrated by the inverted triangle graphic symbol 412A) and a probing command, some embodiments determine which circuit component is being probed by mapping the on-screen location of the click to the location in the displayed design and by determining which circuit component occupies the location in the displayed design. Connectivity corresponding to the probed circuit component (a net segment or a net 410A in FIG. 4C) for the multi-fabric electronic design is then identified. The present invention may then trace the connectivity (in one or both directions) to identify circuit components that are electrically connected to the probed circuit component. Instances 414A and 416A are thus identified.

When reaching pin 422A beyond which the multi-fabric design connectivity may contain no further information, the present invention may open the layout of instance 414A (e.g., by executing or invoking the single layout editing module), reference the binding information, and identify the corresponding pin 416A from the layout and continue tracing the layout connectivity of instance 414A to further identify the circuit components (e.g., the internet net 406B, the internal circuit component 404B, the internal net 408B and pin 418A) that are electrically connected to the corresponding pin 416A.

Similarly, the connectivity of the layout for instance 414A may contain no further information beyond pin 418A. The present invention may again reference the binding information and identify the corresponding pin 424A in the multi-fabric electronic design. The connectivity of the multi-fabric electronic design is then referenced to further identify the circuit components (e.g., net 420A and instance 424A) that are electrically connected to pin 424A. The same may be applied to trace the internal circuit components within instance 424A (and instance 416A). No further connections can be found beyond instance 424A so the process proceeds to proceed to render a customizable detailed view in the multi-fabric electronic design.

Some embodiments may re-render the circuit components that are located in the activated design fabric and are electrically connected to the probed circuit component with graphical and/or textual emphasis. For example, instances 416A, 414A, and 424A as well as nets 410A and 420A may be highlighted in the display window for the currently activated design fabric.

For those internal circuit components (e.g., 416A, 418A, 404B, 406B, and 408B) that belong to a different, non-activated design fabric, editing these internal circuit components may be disabled to isolate the different, non-activated design fabric from the currently activated design fabric. In some embodiments, the present invention generates a customizable detailed view 410C that includes correctly positioned internal circuit components. A graphics processing module may render this view by textually and/or graphically emphasizing these internal circuit components. This customizable detailed view may then replace or overlay the abstracted representation of instance 414A in the display window of the multi-fabric electronic design.

The user interface illustrated in FIG. 4C also includes a design browser 412C that may include information that is cross-linked with the multi-fabric electronic design 402C on display. For example, the design browser 412C may include a collapsible data structure 414C containing data or information pertaining to the circuit components in the multi-fabric electronic design. The data or information may include, for example, various analysis results. The design browser 412C may also include a collapsible tree structure 418C that graphically or textually lists the circuit components in the multi-fabric electronic design according to the hierarchical structure in therein. The design browser 412C may also include other types of information related to any aspects of the electronic.

In response to a probing command and the identification of connected circuit components described above, the corresponding item(s) (e.g., circuit components, their electric characteristics, their parasitic characteristics, relevant analysis results, etc.) in the collapsible data structure 414C may also be graphically and or textually emphasized (416C). In addition or in the alternative, the corresponding item(s) (e.g., circuit components, etc.) in the collapsible tree structure 418C may also be graphically and or textually emphasized (420C). Moreover, a user may probe any circuit component by, for example, clicking on the circuit component in the tree structure 418C or even the circuit component in the collapsible data structure 414C. The present invention thus provides a unique set of tools to enhance users' experiences in using computing system in performing co-design tasks of a multi-fabric electronic design, with the proper contextual information of other design details in different design fabrics.

Figure 5:
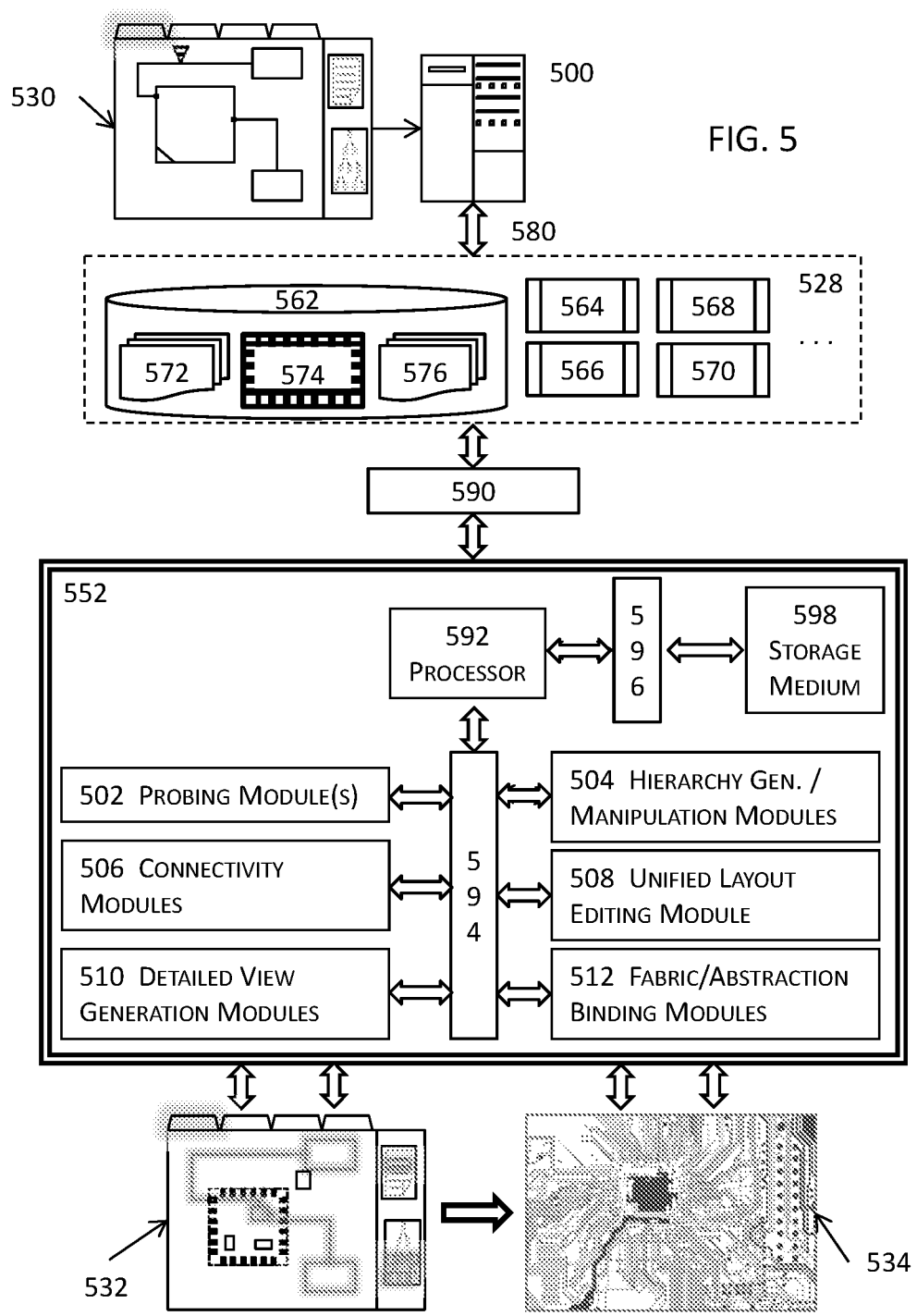
FIG. 5 illustrates an example computing system for probing a multi-fabric electronic design in one or more embodiments.

FIG. 5 illustrates an example computing system that performs various probing a multi-fabric electronic design in one or more embodiments. More specifically, the computing system 500 in FIG. 5 may comprise one or more computing systems 500, such as a general purpose computer described in the System Architecture Overview section to implement one or more special proposes. The illustrative system in FIG. 5 may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 5 may be located in a cloud computing platform in some embodiments.

In this illustrated system in FIG. 5, one or more computing systems 500 may invoke and execute various modules to identify a multi-fabric electronic design 530 (e.g., a layout spanning across the PCB design fabric, the IC package design fabric, the IC design fabric, etc.). These one or more computing systems may further optionally identify, for example, a corresponding schematic design for each design fabric (not shown), a corresponding layout (not shown) for each design fabric, etc. and bind these electronic designs at different abstraction levels (e.g., schematic level, layout level, etc.) in different design fabrics together so that these electronic designs may be cross-referenced with each other. For example, a component in a particular electronic design (e.g., an IC schematic design) can be readily and efficiently identified in the other electronic designs (e.g., the PCB layout, the IC package layout, etc.) with the cross-reference.

The one or more computing systems 500 may invoke and execute a plurality of modules, which are specifically programmed and stored at least partially in memory of and functions in conjunction with at least one microprocessor (e.g., 592) or processor core of the one or more computing system s 500, to perform various functions described herein on the multi-fabric electronic design 530. For example, the one or more computing systems may execute one or more connectivity modules 506 that identify connectivity of the multi-fabric electronic design. The one or more computing systems 500 may further execute one or more probing modules (502) that enable a user to probe any circuit component in an activated tab of the augmented user interface.

In addition or in the alternative, a unified layout editing module (508) may function in conjunction with one or more other modules (e.g., connectivity modules 506, probing modules 502, fabric and abstraction binding modules 512, etc.) to identify nets, net segments, and/or connected circuit components across multiple design fabrics in the multi-fabric electronic design. The one or more fabric and abstraction binding modules 512 bind and cross reference corresponding design data in different abstractions (e.g., the schematic abstraction, the layout abstraction, etc.) across multiple design fabrics (e.g., the PCB design fabric, the IC package design fabric, the IC design fabric, etc.) so that when a circuit component or net segment is identified in one abstraction and one design fabric, the corresponding circuit components in other abstractions and/or design fabrics can be efficiently identified with the binding information. For example, the binding information may cross reference identifiers of the same circuit component indifferent design fabrics (if the circuit component has different identifiers in different design fabrics). The cross references and binding may be stored in one or more data structures that may be more efficiently identified (e.g., by lookup) from the one or more data structures.

Moreover, one or more detailed view generation modules (510) may be executed to generate a representation (e.g., a static or dynamic yet non-editable view) for circuit components and nets that do not belong to the activated design fabric. These one or more detailed view generation modules (510) may further overlay the artificially generated representation of such nets and circuit components in the electronic design displayed under the activated tab to render a composite view 532 including editable design data in the activated design fabric and the overlaid view of some non-editable electronic circuit components. The present invention may then cause the occurrence of manufacturing or fabrication of the underlying electronic circuit 534 at least by forwarding a final version (e.g., a signed-off version) of the electronic design to fabrication equipment (e.g., photomask manufacturing equipment, lithographic equipment, etc.) Any of the modules described herein may also function in conjunction with one or more hierarchy generation and manipulation modules 504 to manipulate various hierarchical structures of various electronic designs in multiple hierarchies. These one or more hierarchy generation and manipulation modules 504 may also manipulate various layers in each design (e.g., schematic design, layout, etc.)

For a multi-fabric electronic design, a hierarchy generation and manipulation module 504 may generate a hierarchical structure by incorporating existing hierarchical structures in one or more design fabrics while generating anew an overall hierarchical structure for the entire multi-fabric electronic design. For example, a PCB layout, an IC package layout, and an IC layout have their own respective hierarchical structures although the PCB layout hierarchical structure may include only the IC package layout at one child hierarchical level that includes no further child hierarchical levels because the PCB designer more likely has a right to integrate IC package layouts into the PCB layout as abstracted instances that do not reveal the design details other than, for example, interface elements (e.g., pins). In some embodiments, a hierarchy generation and manipulation module 504 may incorporate, to the extent permitted, the hierarchical structures in various design fabrics into an overall hierarchical structure. The hierarchy generation and manipulation module 504 may further generate a data structure therefor or generate links among the existing hierarchical structures to link these existing hierarchical structures together as a part of the binding information among multiple design fabrics.

In some embodiments, the one or more computing systems 500 may invoke various system resources such as the processor(s) or processor core(s), memory, disks, etc. The one or more computing systems 500 may also initiate or interact with other computing systems to access, via a computer bus architecture (e.g., a system bus, a control bus, a data bus, or any combinations thereof), various resources 528 that may comprise a floorplanner, a global routing engine, and/or a detail routing engine 564, a layout editor 566, a design rule checker 568, a verification engine 570, etc. In some embodiments, each design fabric may have its own dedicated, native engines, editors, checkers, etc. mentioned above. In some other embodiments, multiple design fabrics (e.g., an IC package design fabric and an IC design fabric) may use a single unified tool (e.g., a single, unified layout editor) that performs its functions to fulfill the respective needs in these multiple design fabrics.

These various resources 528 may further include, for example, one or more other EDA (electronic design automation) modules such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design. Once sign-off and/or design closure is achieved, the electronic design (e.g., a modified version of 530 with reduced interferences and disturbances) is finalized for tapeout; and the electronic design is transmitted to mask fabrication equipment for mask preparation and mask writing to produce photomasks that are then used in the actual manufacturing of the electronic circuits represented by the electronic design.

The one or more computing systems 500 may further write to and read from a local or remote (e.g., networked storage device(s)) non-transitory computer accessible storage 562 that stores thereupon data or information such as, but not limited to, one or more databases (574) such as schematic design database(s) or physical design database(s), electronic circuit design specification database(s), techfiles for multiple design fabrics, various statistics, various data, rule decks, various design rules, constraints, etc. (572), or other information or data (576) that may be used to facilitate the performance of various functions to achieve the intended purposes. The one or more databases may also include, for example, one or more data structures for facilitating determination of layout equivalence in multi-fabric electronic designs.

In some embodiments, the computing system 500 may include the various resources 528 such that these various resources may be invoked from within the computing system via a network or a computer bus 580 (e.g., an internet session, an intranet session, a data bus interfacing a microprocessor 592 and the non-transitory computer accessible storage medium 598 or a system bus 590 between a microprocessor 592 and one or more engines in the various resources 528). In some other embodiments, some or all of these various resources may be located remotely from the computing system 500 such that the computing system may access the some or all of these resources via a computer bus 580 and one or more network components.

The computing system may also include one or more modules in the set of co-design modules 552. One or more modules in the set 552 may include or at least function in conjunction with a microprocessor 592 via a computer bus 594 to access or invoke various modules in 552 (e.g., 502-512 described above) in some embodiments. In these embodiments, a single microprocessor 592 may be included in and thus shared among more than one module even when the computing system 500 includes only one microprocessor 592. A microprocessor 592 may further access some non-transitory memory 598 (e.g., random access memory or RAM) via a system bus 596 to read and/or write data during the microprocessor's execution of processes.

The set of modules 552 may also include one or more extraction modules to identify various data or information such as the schematic connectivity from a schematic design, physical design connectivity from a hierarchical physical design, parasitics from a hierarchical physical design, and/or hierarchy information from a hierarchical schematic design and/or a hierarchical physical design. The set of modules 552 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

In some embodiments, the computing system 500 may include the various resources 528 such that these various resources may be invoked from within the computing system via a computer bus 580 (e.g., a data bus interfacing a microprocessor 592 and the non-transitory computer accessible storage medium 598 or a system bus 590 between a microprocessor 592 and one or more engines in the various resources 528). In some other embodiments, some or all of these various resources may be located remotely from the computing system 500 such that the computing system may access the some or all of these resources via a computer bus 580 and one or more network components.

The computing system may also include one or more modules in the set of modules 552. One or more modules in the set 552 may include or at least function in tandem with a microprocessor 592 via a computer bus 594 in some embodiments. In these embodiments, a single microprocessor 592 may be included in and thus shared among more than one module even when the computing system 500 includes only one microprocessor 592. A microprocessor 592 may further access some non-transitory memory 598 (e.g., random access memory or RAM) via a system bus 596 to read and/or write data during the microprocessor's execution of processes.

The one or more computing systems 500 may invoke and execute one or more modules in 528 and/or 552 to perform various functions. Each of these modules may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 500 for execution.

System Architecture Overview

Figure 6:
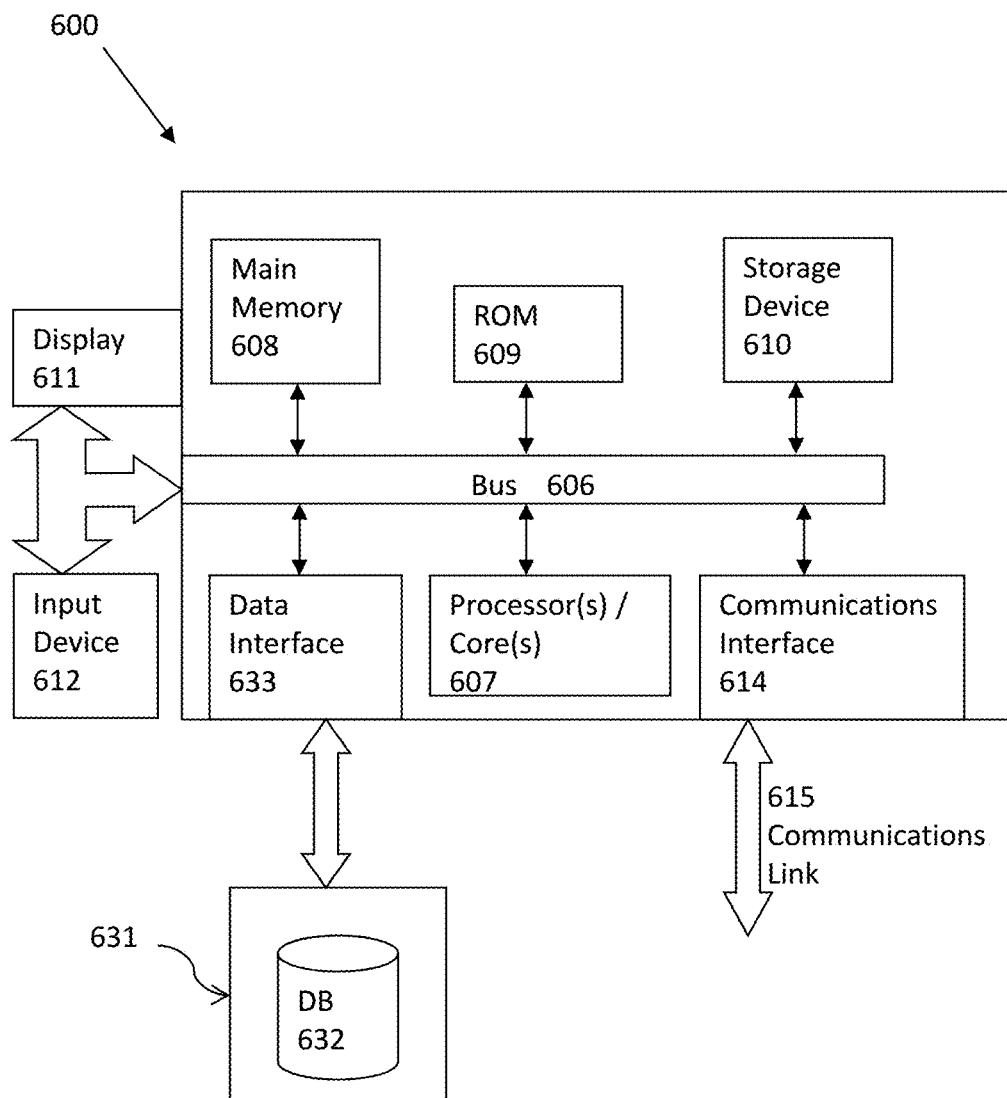
FIG. 6 illustrates a computerized system on which a method for probing a multi-fabric electronic design may be implemented.

FIG. 6 illustrates a computerized system on which a method for probing a multi-fabric electronic design may be implemented. Computer system 600 includes a bus 606 or other communication module for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown). The illustrative computing system 600 may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 600 may include or may be a part of a cloud computing platform in some embodiments.

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program (e.g., application code) through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633. A data interface 633, which is coupled to the bus 606 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

I claim:

1. A computer implemented method for probing a multi-fabric electronic design, comprising:

identifying a single layout editor, a first electronic design in a first design fabric, and a second electronic design in a second design fabric;

identifying, at a user interface of a computing system, an input for probing a circuit component in the first electronic design, wherein the circuit component is connected to an instance of the second electronic design; and in response to the input, rendering, by one or more co-design modules stored at least partially in memory of and functioning in conjunction with at least one microprocessor of a computing system, a representation of the first layout in the first design fabric wherein rendering the representation of the first layout comprises:

creating an artificial layout representation having one or more emphasized circuit components in the first design fabric and the second design fabric; and replacing or overlaying an existing layout representation in the electronic design with the artificial layout representation, wherein the emphasized circuit components are identified at least by tracing connectivity across one or more boundaries of two or more design fabrics in response the input.

2. The computer implemented method of claim 1, wherein receiving the input for probing the circuit component comprises:

identifying the first design fabric as an active design fabric, wherein at least one emphasized circuit component of the one or more emphasized circuit components is in a design fabric that is non-editable by using the single layout editor; and receiving the input at the user interface via an input device that identifies a cursor location on a display of the computing system.

3. The computer implemented method of claim 2, wherein receiving the input for probing the circuit component further comprises:

identifying the circuit component for probing at least by mapping the cursor location to a design location and by determining the circuit component in the active design fabric with the design location; and identifying second design fabric connectivity pertaining to the circuit component in the active design fabric based at least in part upon first design fabric connectivity.

4. The computer implemented method of claim 3, wherein receiving the input for probing the circuit component comprises:
  identifying the instance based at least in part the first design fabric connectivity or the second design fabric connectivity.

5. The computer implemented method of claim 1, wherein rendering the representation comprises:
  identifying at least one net corresponding to the input based at least in part upon first design fabric connectivity; and
  identifying and flagging one or more circuit components that include the instance along the at least one net in the first design fabric.

6. The computer implemented method of claim 5, wherein rendering the representation comprises:
  modifying or re-generating a first representation of the one or more circuit components with emphasis; and
  identifying a layout of the second electronic design in the second design fabric with at least the first design fabric connectivity pertaining to the instance.

7. The computer implemented method of claim 6, wherein rendering the representation comprises:
  rendering a customizable detailed view with design data from the layout of the second electronic design in the second design fabric; and
  replacing or overlaying an abstracted representation of the instance in the first electronic design with the customizable detailed view of the instance.

8. The computer implemented method of claim 7, wherein rendering the representation comprises:
  identifying an internet net from the layout of the instance in the second design fabric with at least the first design fabric connectivity and the second design fabric connectivity; and
  identifying one or more internal circuit components in the layout of the instance along the internet.

9. The computer implemented method of claim 8, wherein rendering the representation comprises:
  transforming the customizable detailed view into a transformed customizable detailed view at least by rendering a second representation of the one or more internal circuit components with emphasis; and
  replacing or overlaying the customizable detailed view with the transformed customizable detailed view in the user interface corresponding to an active design fabric.

10. The computer implemented method of claim 9, wherein rendering the representation comprises:
  updating a design browser with information about the at least one net, the one or more circuit components, the internal net, and the one or more internal circuit components in the user interface.

11. A system for probing a multi-fabric electronic design, comprising:
  non-transitory computer accessible storage medium storing thereupon program code; and
  one or more one or more co-design modules stored at least partially in memory of and functioning in conjunction with at least one microprocessor of one or more computing systems, wherein the at least one microprocessor of the one or more computing systems is configured to execute at least the one or more co-design modules at least to:
    identify a single layout editor, a first electronic design in a first design fabric, and a second electronic design in a second design fabric;
    identify, at a user interface of the computing system, an input for probing a circuit component in the first electronic design, wherein the circuit component is connected to an instance of the second electronic design; and
    in response to the input, render a representation of the first layout in the first design fabric, wherein the at least one microprocessor that is configured to render the representation of the first layout is further executes at least the one or more co-design modules to:
      create an artificial layout representation having one or more emphasized circuit components in the first design fabric and the second design fabric; and
      replace or overlay an existing layout representation in the electronic design with the artificial layout representation, wherein
        the emphasized circuit components are identified at least by tracing connectivity across one or more boundaries of two or more design fabrics in response the input.

12. The system for claim 11, wherein the at least one micro-processor that is configured to execute at least the one or more co-design modules is further configured to:
  identify the first design fabric as an active design fabric, wherein at least one emphasized circuit component of the one or more emphasized circuit components is in a design fabric that is non-editable by using the single layout editor;
  receive the input at the user interface via an input device that identifies a cursor location on a display of the computing system; and
  identify the circuit component for probing at least by mapping the cursor location to a design location and by determining the circuit component in the active design fabric with the design location.

13. The system for claim 12, wherein the at least one micro-processor that is configured to execute at least the one or more co-design modules is further configured to:
  identify second design fabric connectivity pertaining to the circuit component in the active design fabric based at least in part upon first design fabric connectivity; and
  identify the instance based at least in part the first design fabric connectivity or the second design fabric connectivity.

14. The system for claim 11, wherein the at least one micro-processor that is configured to execute at least the one or more co-design modules is further configured to:
  identify at least one net corresponding to the input based at least in part upon first design fabric connectivity;
  identify and flagging one or more circuit components that include the instance along the at least one net in the first design fabric;
  modify or re-generating a first representation of the one or more circuit components with emphasis;
  identify a layout of the second electronic design in the second design fabric with at least the first design fabric connectivity pertaining to the instance;
  render a customizable detailed view with design data from the layout of the second electronic design in the second design fabric; and
  replace or overlay an abstracted representation of the instance in the first electronic design with the customizable detailed view of the instance.

15. The system for claim 14, wherein the at least one micro-processor that is configured to execute at least the one or more co-design modules is further configured to:

identify an internet net from the layout of the instance in the second design fabric with at least the first design fabric connectivity and the second design fabric connectivity;

identify one or more internal circuit components in the layout of the instance along the internet;

transform the customizable detailed view into a transformed customizable detailed view at least by rendering a second representation of the one or more internal circuit components with emphasis;

replace or overlay the customizable detailed view with the transformed customizable detailed view in the user interface corresponding to an active design fabric; and update a design browser with information about the at least one net, the one or more circuit components, the internal net, and the one or more internal circuit components in the user interface.

16. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for probing a multi-fabric electronic design, the set of acts comprising:

identifying a single layout editor, a first electronic design in a first design fabric, and a second electronic design in a second design fabric;

identifying, at a user interface of a computing, an input for probing a circuit component in the first electronic design, wherein the circuit component is connected to an instance of the second electronic design; and in response to the input, rendering, by one or more co-design modules stored at least partially in memory of and functioning in conjunction with at least one microprocessor of a computing system, a representation of the first layout in the first deign fabric wherein rendering the representation of the first layout comprises:

creating an artificial layout representation having one or more emphasized circuit components in the first design fabric and the second design fabric; and replacing or overlaying an existing layout representation in the electronic design with the artificial layout representation, wherein the emphasized circuit components are identified at least by tracing connectivity across one or more boundaries of two or more design fabrics in response the input.

17. The article of manufacture of claim 16, the set of acts further comprising:

identifying the first design fabric as an active design fabric, wherein at least one emphasized circuit component of the one or more emphasized circuit components is in a design fabric that is non-editable by using the single layout editor;

receiving the input at the user interface via an input device that identifies a cursor location on a display of the computing system; and identifying the circuit component for probing at least by mapping the cursor location to a design location and by determining the circuit component in the active design fabric with the design location.

18. The article of manufacture of claim 17, the set of acts further comprising:

identifying second design fabric connectivity pertaining to the circuit component in the active design fabric based at least in part upon first design fabric connectivity; and identifying the instance based at least in part the first design fabric connectivity or the second design fabric connectivity.

19. The article of manufacture of claim 16, the set of acts further comprising:

identifying at least one net corresponding to the input based at least in part upon first design fabric connectivity;

identifying and flagging one or more circuit components that include the instance along the at least one net in the first design fabric;

modifying or re-generating a first representation of the one or more circuit components with emphasis;

identifying a layout of the second electronic design in the second design fabric with at least the first design fabric connectivity pertaining to the instance;

rendering a customizable detailed view with design data from the layout of the second electronic design in the second design fabric; and replacing or overlaying an abstracted representation of the instance in the first electronic design with the customizable detailed view of the instance.

20. The article of manufacture of claim 19, the set of acts further comprising:

identifying an internet net from the layout of the instance in the second design fabric with at least the first design fabric connectivity and the second design fabric connectivity;

identifying one or more internal circuit components in the layout of the instance along the internet;

transforming the customizable detailed view into a transformed customizable detailed view at least by rendering a second representation of the one or more internal circuit components with emphasis;

replacing or overlaying the customizable detailed view with the transformed customizable detailed view in the user interface corresponding to an active design fabric; and updating a design browser with information about the at least one net, the one or more circuit components, the internal net, and the one or more internal circuit components in the user interface.

* * * * *